(12) United States Patent
Cluff

(10) Patent No.: US 11,906,225 B2
(45) Date of Patent: Feb. 20, 2024

(54) METHOD AND SYSTEM FOR CONTROLLING COMPRESSOR TEMPERATURE

(71) Applicant: Carrier Corporation, Palm Beach Gardens, FL (US)

(72) Inventor: Charles A. Cluff, Zionsville, IN (US)

(*) Notice: Subject to any disclaimer, the term of this patent is extended or adjusted under 35 U.S.C. 154(b) by 354 days.

(21) Appl. No.: 17/248,730

(22) Filed: Feb. 4, 2021

(65) Prior Publication Data

US 2021/0262717 A1 Aug. 26, 2021

Related U.S. Application Data

(60) Provisional application No. 62/979,753, filed on Feb. 21, 2020.

(51) Int. Cl.
F25B 49/02 (2006.01)
G05B 15/02 (2006.01)
F04D 27/00 (2006.01)

(52) U.S. Cl.
CPC ............ *F25B 49/022* (2013.01); *F04D 27/00* (2013.01); *G05B 15/02* (2013.01); *F25B 2500/08* (2013.01); *F25B 2600/0252* (2013.01); *F25B 2700/151* (2013.01)

(58) Field of Classification Search
CPC ................ C12Q 1/6837; C12Q 1/6883; C12Q 2600/156; F04D 25/06; F04D 27/00; F04D 27/0292; F05D 2270/303; F25B 2400/01; F25B 2500/08; F25B 2500/26; F25B 2500/31; F25B 2600/01; F25B 2600/02552; F25B 2700/151; F25B 49/022; F25B 49/025; G05B 15/02; H02P 23/14; H02P 29/60
See application file for complete search history.

(56) References Cited

U.S. PATENT DOCUMENTS

| | | | |
|---|---|---|---|
| 8,616,855 B2 | 12/2013 | Burchill et al. | |
| 9,291,167 B2 | 3/2016 | Schreiber | |
| 10,389,285 B2 | 8/2019 | Magee et al. | |
| 2009/0001921 A1* | 1/2009 | Mills, Jr. | H02P 1/44 318/789 |
| 2009/0051311 A1* | 2/2009 | Lu | H02P 23/14 318/806 |
| 2014/0363311 A1* | 12/2014 | Schreiber | F04D 29/053 417/420 |
| 2015/0155701 A1* | 6/2015 | Wallis | H02H 7/0833 361/31 |
| 2018/0076749 A1* | 3/2018 | Magee | H02P 21/24 |

* cited by examiner

Primary Examiner — Kidest Bahta

(57) ABSTRACT

A method for controlling the temperature of a compressor having a motor including a rotor and a stator, and a control assembly operably coupled to the compressor, the method comprising the steps of: applying an initial current to the compressor motor; measuring a voltage across the compressor motor and determining a resistance of the compressor motor based on the initial current and a measured voltage; determining whether the determined resistance is less than or equal to a desired resistance; applying a secondary current to the compressor motor if the determined resistance is less than or equal to the desired resistance.

19 Claims, 3 Drawing Sheets

METHOD AND SYSTEM FOR CONTROLLING COMPRESSOR TEMPERATURE

CROSS REFERENCE TO A RELATED APPLICATION

The application claims the benefit of U.S. Provisional Application No. 62/979,753 filed Feb. 21, 2020, the contents of which are hereby incorporated in their entirety.

BACKGROUND

The subject matter disclosed herein generally relates to a method and system for controlling the temperature of an electric motor and adjacent fluids. More particularly, the subject disclosed relates to controlling the temperature of a compressor.

Electric motors, such as those used in a compressor for heating, ventilation and air conditioning and/or refrigeration (HVAC/R) applications, drive a compressor which circulates a working fluid (e.g., a refrigerant) under pressure, as in a typical vapor compression system. When a compressor is running (e.g., performing mechanical work), refrigerant continuously cycles through a vapor compression system. However, when a compressor is off (e.g., not performing mechanical work), refrigerant may migrate to a compressor sump due to a temperature differential that may exist between the compressor and other components of the vapor compression system. The presence of refrigerant in a compressor sump at start-up may produce an unwanted condition known as a "flooded start," which can cause the compressor to experience operating stress, and reduce reliability.

It is important then, to control and maintain the temperature of a compressor when it is off to ensure compressor operating reliability. A number of mechanical methods exist for addressing this problem, such as applying direct or indirect heat to parts of a compressor (e.g., sump or compressor motor). For example, a crankcase heater may be used to apply heat to a compressor. A crankcase may be mounted externally around the base of a compressor. Alternatively, wires may be directly attached to the input side of the contact from the main power supply. In this case, the power is always on, including when the compressor is running, which may result in an unwanted condition known as thermal runaway. As the compressor temperature increases (from the combination of mechanical work and additional supplied current), the electrical resistance of the compressor increases. As resistance increases, more power is required to operate the compressor, further causing increases in resistance and compressor temperature. This positive thermal feedback loop may affect the overall performance of a compressor.

What is needed then, is an improved method and system for monitoring and controlling the temperature of a compressor, by providing heat to the compressor when it is off.

BRIEF DESCRIPTION OF THE INVENTION

According to one non-limiting embodiment, a method for controlling the temperature of a compressor having a motor including a rotor and a stator, and a control assembly operably coupled to the compressor, the method including the steps of: applying an initial current to the compressor motor; measuring a voltage across the compressor motor and determining a resistance of the compressor motor based on the initial current and a measured voltage; determining whether the determined resistance is less than or equal to a desired resistance; applying a secondary current to the compressor motor if the determined resistance is less than or equal to the desired resistance.

In addition to one or more of the features described above, or as an alternative, in further embodiments, the method for controlling the temperature of a compressor wherein the initial current and the secondary current are applied to at least one of the rotor and the stator.

In addition to one or more of the features described above, or as an alternative, in further embodiments, the method for controlling the temperature of a compressor wherein the at least one of the initial current and the secondary current is applied in at least one of a fixed and variable quantity.

In addition to one or more of the features described above, or as an alternative, in further embodiments, the method for controlling the temperature of a compressor wherein the at least one of the initial current and the secondary current is applied for a period of time.

In addition to one or more of the features described above, or as an alternative, in further embodiments, the method for controlling the temperature of a compressor wherein the desired resistance comprises at least one of an upper resistance limit and lower resistance limit.

In addition to one or more of the features described above, or as an alternative, in further embodiments, the method for controlling the temperature of a compressor wherein when the determined resistance is less than the lower resistance limit, the secondary current is applied until the determined resistance is greater than or equal to the upper resistance limit.

According to one non-limiting embodiment, a vapor compression system including: a compressor, having a motor including a rotor and a stator; a control assembly operably coupled to the compressor motor, the control assembly configured to: apply an initial current to the compressor motor; measure a voltage across the compressor motor and determine a resistance of the compressor motor based on the initial current and the measured voltage; determine whether the determined resistance is less than or equal to a desired resistance; apply a secondary current to the compressor motor if the determined resistance is less than or equal to the desired resistance.

In addition to one or more of the features described above, or as an alternative, in further embodiments, the vapor compression system wherein the control assembly is configured to apply at least one of the initial current and the secondary current to at least one of the rotor and the stator.

In addition to one or more of the features described above, or as an alternative, in further embodiments, the vapor compression system wherein the at least one initial current and secondary current is applied in at least one of a fixed or variable quantity.

In addition to one or more of the features described above, or as an alternative, in further embodiments, the vapor compression system wherein the at least one initial current and secondary current is applied for period of time.

In addition to one or more of the features described above, or as an alternative, in further embodiments, the vapor compression system wherein the desired resistance comprises at least one of an upper resistance limit and lower resistance limit.

In addition to one or more of the features described above, or as an alternative, in further embodiments, the vapor compression system wherein when the determined resistance is less than the lower resistance limit, the control assembly is configured to apply the secondary current until the determined resistance is greater than or equal to the upper resistance limit.

According to one non-limiting embodiment, a control assembly including: at least one connection configured to attach to a component; a control device operably coupled to the at least one connection, the control device configured to apply an initial current to the component; measure a voltage across the component and determine a resistance of the component based on the initial current and the measured voltage; determine whether the determined resistance is less than or equal to a desired resistance; and apply a secondary current if the determined resistance is les s than or equal to the desired compressor resistance.

In addition to one or more of the features described above, or as an alternative, in further embodiments, the control assembly wherein the component comprises a motor comprising a rotor and stator.

In addition to one or more of the features described above, or as an alternative, in further embodiments, the control assembly wherein the control device is configured to apply at least one of the initial current and the secondary current to at least one of the rotor and the stator.

In addition to one or more of the features described above, or as an alternative, in further embodiments, the control assembly wherein the at least one initial current and secondary current is applied in at least one of a fixed or variable quantity.

In addition to one or more of the features described above, or as an alternative, in further embodiments, wherein the at least one initial current and secondary current is applied for a period of time.

In addition to one or more of the features described above, or as an alternative, in further embodiments, the control assembly wherein the desired resistance comprises at least one of an upper resistance limit and lower resistance limit.

In addition to one or more of the features described above, or as an alternative, in further embodiments, the control assembly wherein when the determined resistance is less than the lower resistance limit, the control device is configured to apply the secondary current until the determined resistance is greater than or equal to the upper resistance limit.

BRIEF DESCRIPTION OF THE DRAWINGS

The accompanying drawings form a part of the specification. Throughout the drawings, like reference numbers identify like elements.

DETAILED DESCRIPTION OF THE INVENTION

As will be described in greater detail below the present disclosure provides for controlling the temperature of a compressor. It should be evident however to one skilled in the art that the present disclosure is not limited to the specific examples given and could be used in other systems where controlling the temperature of a compressor may be required.

Figure 1:
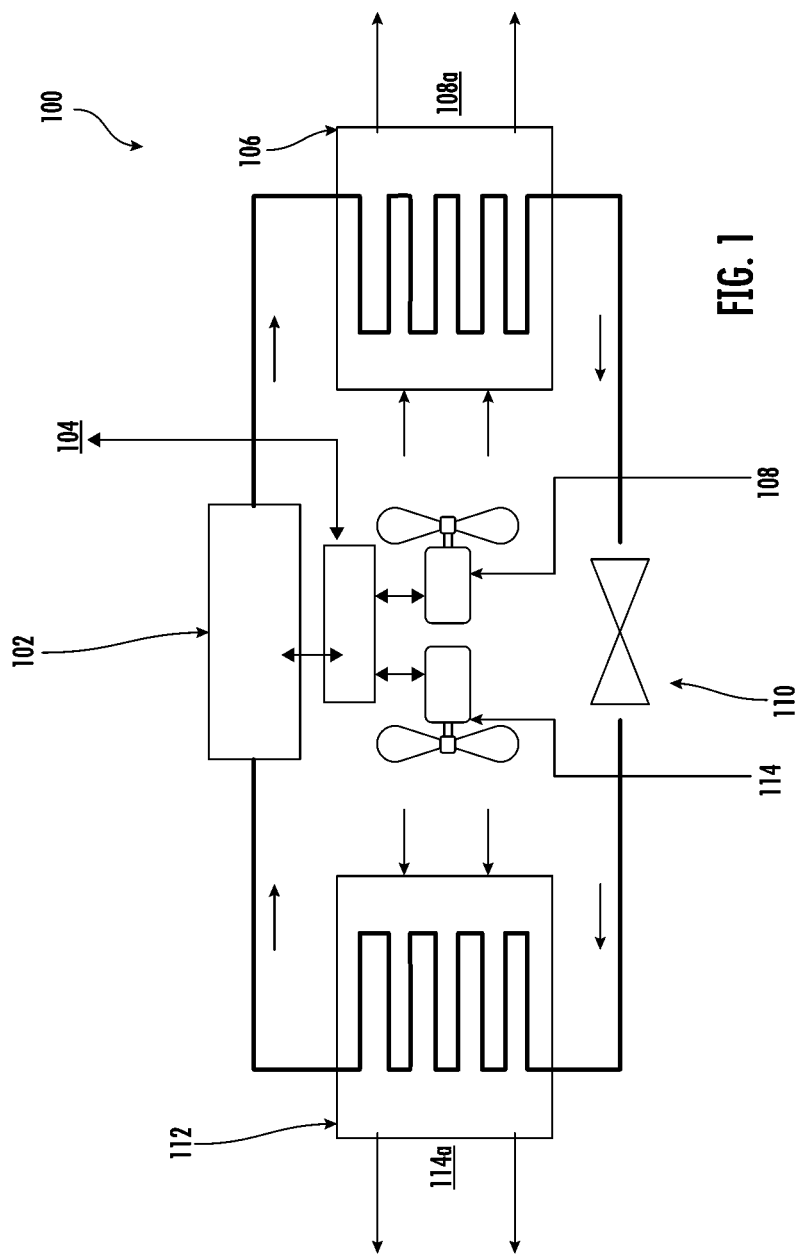
FIG. 1 is a schematic representation of vapor compression system in accordance with embodiments of the disclosure.

Turning to FIG. 1, a typical HVAC/R vapor compression system 100 is shown. The system 100 includes compressor 102, control assembly 104, condenser 106, condenser fan and motor 108, expansion device 110, evaporator 112, and blower motor and fan 114. Control assembly 104, operably coupled to compressor 102, operates to control compressor temperature by the method discussed below. Compressor 102 is configured to circulate a working fluid (e.g., refrigerant) through the system 100. By way of example and not limitation, compressor 102 may be of a type used in residential or commercial HVAC units, including both single speed and variable speed compressors and may also include compressors used in commercial refrigeration.

For example, when the vapor compression system 100 is operational, a refrigerant is circulated under pressure. Low pressure vapor refrigerant enters compressor 102 which operates to transform the refrigerant into a high pressure vapor. The refrigerant vapor exits compressor 102 and flows to condenser 106. The condenser fan and motor 108 forces air 108a through the condenser 106, where the refrigerant is transformed into a high pressure liquid. The high pressure liquid then enters the expansion device 110 which controls the flow of refrigerant into evaporator 112, reducing pressure and vaporizing a portion of the liquid creating a fluid of mixed vapor and liquid refrigerant. The lower temperature liquid-vapor mixture flows through evaporator 112. A blower motor and fan 114 direct air 114a across the evaporator 112, cooling the air 114a, and further causing the liquid part of the refrigerant mixture to evaporate turning the refrigerant to a vapor. The vapor refrigerant exits evaporator 112 and returns to compressor 102 where the cycle is repeated.

Figure 2:
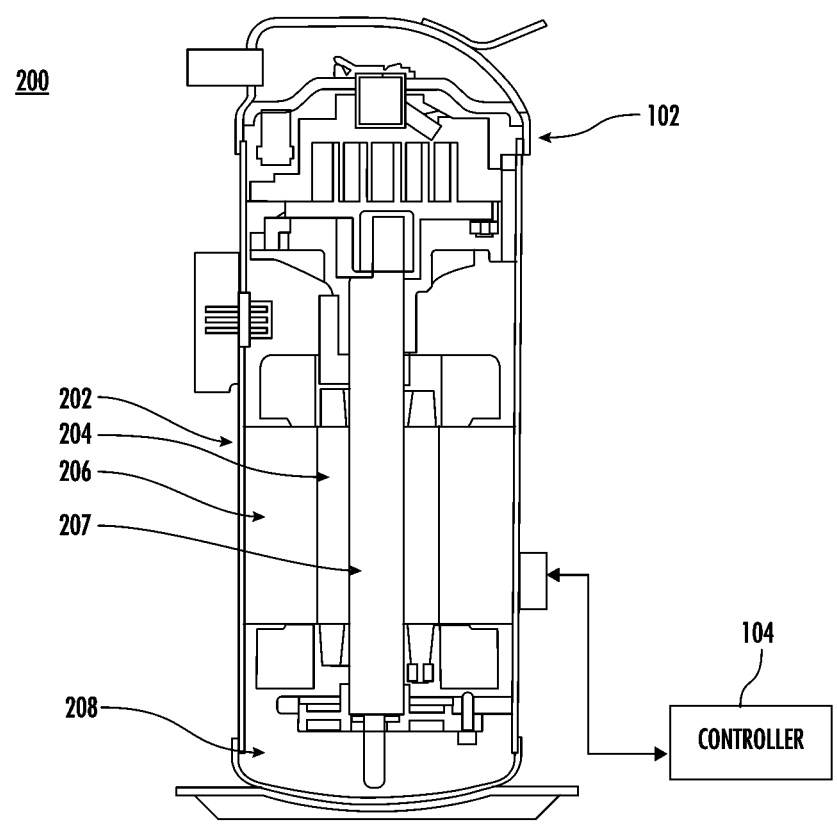
FIG. 2 is a cross-sectional view of a compressor control system in accordance with embodiments of the disclosure.

In addition, when the vapor compression system 100 is operational, and the compressor 102 is running properly, refrigerant will not collect in the compressor sump FIG. 2, 208. When the vapor compression system 100 is off, and no electrical current is present in compressor 102, the internal temperature of the compressor 102 will drop. Over time, the compressor 102 may become the coldest part of vapor compression system 100. Since refrigerant tends to migrate to the coldest part of a vapor compression system 100, refrigerant may over time, migrate toward the compressor 102, and settle in the sump FIG. 2, 208.

Turning to FIG. 2, an exemplary embodiment of a compressor control system 200 for monitoring and controlling the temperature of a compressor 102 is shown. The compressor control system 200 includes the compressor 102 and the control assembly 104. The compressor 102 has disposed therein, a motor 202 and a sump 208. The motor 202 has a rotor 204, a stator 206 and a shaft 207. In general, a stator 206 is an electromagnet which generally consists of electrical windings (e.g., copper wire) around a non-permanently magnetized ferromagnetic core material (e.g., iron). When external power (e.g., alternating current) is supplied to compressor 102 and motor 202, the stator 206 is energized, producing a magnetic field. The interaction between the magnetic field in the stator 206 and the electric field created by external power, causes the rotor 204 to turn a shaft 207. When the compressor 102 is running, the shaft 207 operates a compression mechanism that permits refrigerant to be sucked into the compressor 102, compressing the refrigerant and discharging the refrigerant to the condenser 106. When compressor 102 is off, and current is applied to the motor 202 as discussed below, the current may provide indirect heat to the compressor 102 without also operating the compression mechanism.

In one non-limiting embodiment, control assembly 104 may be operably coupled to an external power source (e.g., AC current) on the one hand, and to compressor 102 (including at least one of the motor 202, rotor 204, stator 206 and shaft 207) on the other hand, by at least one connection. A connection may include one or more wires, including a cable harness, or wire harness, or wire assembly for transmitting and receiving electrical signals and/or power. For example, one or more wires may connect the control assembly 104 to an AC power source on the one hand, and to compressor motor 202, on the other hand.

Control assembly 104 may be integrated with, or external to, compressor 104. In one non-limiting embodiment, the control assembly 104 may be part of the controls scheme for the condenser 106. For example, the control assembly 104 may be part of a residential or commercial outdoor HVAC unit, such as an air conditioner or heat pump to name a couple of non-limiting examples. In one non-limiting embodiment, control assembly 104 may be attached to the exterior housing of compressor 102. For example, the motor 202 disposed within the compressor 102, may be connected by wire assembly to the control assembly 104 attached to the exterior of compressor 102; and a wire assembly may connect the control assembly 104 to AC power. In another alternate non-limiting embodiment, control assembly 104 may be further connected to a separate control panel. For example, a vapor compression system may have a central control panel for operating and controlling components of a vapor compression system, such as compressor 102. In this example, a wire assembly may further connect the compressor 102 and control assembly 104, to a control panel.

Control assembly 104 may be configured to communicate between an external power source and compressor 102 (including motor 202), and/or between compressor 102 (including motor 202) and one or more of a control panel, a computer (e.g., desktop computer, laptop computer or tablet), a portable electronic device (e.g., smart phone, tablet), a central server or cloud computing system, or a device that is network connected anywhere in the world. Data communications can be carried out using any of a variety of custom or standard wired or wireless protocols for commercial or residential use (LAN, WAN, Wi-Fi, ZigBee, 6LoWPAN, CAT6 Ethernet, HomePlug, etc.). Control assembly 104 may also include a memory configured to store at least one desired resistance limit or range discussed below, and a processor operably coupled to the memory. The processor may be configured to carry out the steps of the method discussed below.

Figure 3:
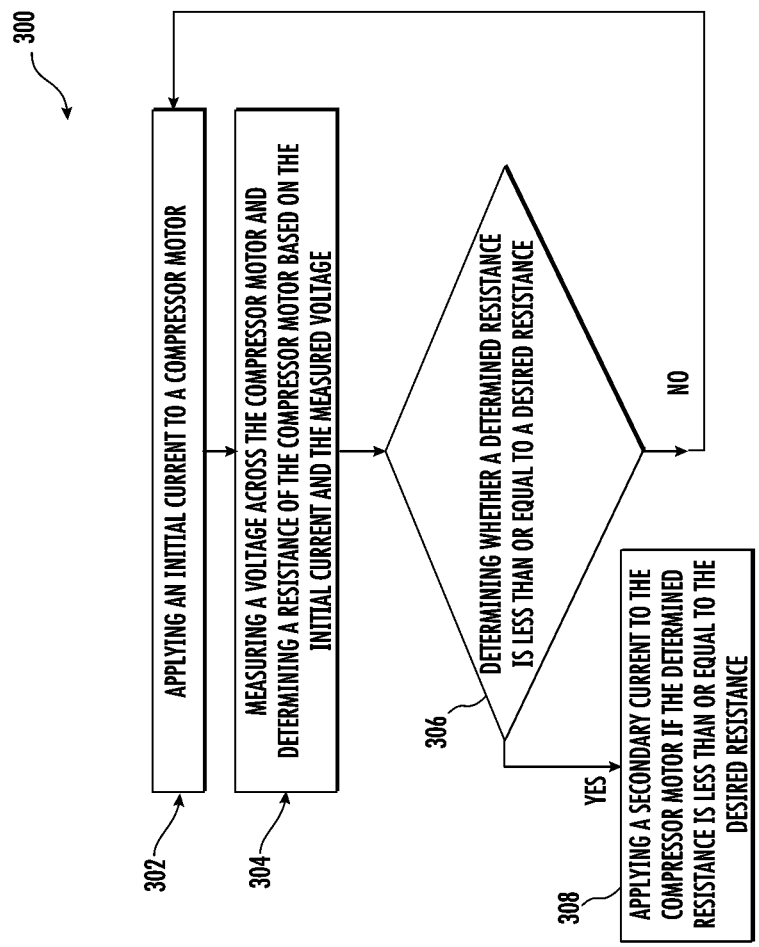
FIG. 3 illustrates a compressor temperature control method in accordance with embodiments of the disclosure.

Turning to FIG. 3, method 300 utilizes control assembly 104 to reduce the likelihood that a working fluid, such as refrigerant, will migrate and/or collect in the sump 208 of compressor 102 based on the electrically resistive properties of the motor 202.

In general, the motor 202 (i.e., the rotor 204) has electrically resistive properties which can be affected by changes in temperature. For example, an increase in electrical resistance across the stator 206, typically indicates that the temperature of the stator 206 has also increased. Similarly, a decrease in electrical resistance across the stator 206, typically indicates that the temperature of the stator 206 has also decreased. In this example, and as further discussed below, the method 300 uses an initial current to monitor the electrical resistance of a compressor component (e.g., motor 202), to determine whether a secondary current should be applied to increase electrical resistance in a compressor component, thereby providing indirect heat to the compressor 102 to eliminate or reduce refrigerant in the sump 208.

The method begins at 302 when the vapor compression system 100 is off. The "compressor off" signal may originate from the compressor 102, or may be received from a central system that operates the vapor compression system 100 (e.g., a control panel). Once active, control assembly 104 is configured to deliver an initial current from the external power source to a component of compressor 102. In an embodiment, the initial current is applied to the motor 202. In an embodiment, the initial current is applied to at least one of the rotor 204 and the stator 207.

The initial current, which may be fixed or variable in quantity (e.g., amperes) and/or frequency (e.g., time), may be used to determine the resistance across a compressor component. For example, the initial current may be applied to motor 202 for a period of time sufficient for the control assembly 104 to determine the resistance across motor 202.

In step 304, the control assembly 104 is configured to determine an electrical resistance of the compressor component. As the initial current is applied, the control assembly 104 is configured to measure voltage across the closed circuit. For example, Ohm's Law may be used to determine resistance of stator 206 since the applied initial current and measured voltage are known. Continuing with the example, if the control assembly 104 applies an initial current and measures a voltage across the circuit, then the control assembly 104 can determine the resistance across the stator 206 using Ohm's law (e.g., R=V/I). In this example, the determined resistance of the stator 206, corresponds to a temperature value based on the electrically resistive properties of the stator 206. Once resistance is determined in step 304, the method proceeds to step 306.

In step 306, the control assembly 104 is configured to compare the determined resistance in step 304, to a desired resistance limit or range. When the determined resistance is lower than a desired resistance a secondary current may be applied to the compressor 102 component as discussed later. It will be appreciated that the desired resistance limit or range may be adjustable.

Control assembly 104 may be configured to store at least one desired resistance limit or range. The desired resistance may be based in part, on the temperature coefficient of resistance which is the measure of change in electrical resistance of any substance per degree of temperature change. For example, copper has a temperature coefficient of resistance of 0.00218 per degree Fahrenheit (0.00218/° F.). This means that for each increase of 1° F., the electrical resistance of copper increases by a factor of 0.00218. In this example, the desired resistance may be based on the electrical resistance across the copper windings of the stator 206, at a known temperature. To illustrate, if the electrical resistance across a stator 206 is determined, the temperature of the stator 206 may also be determined to be within a range, based in part on the temperature coefficient of resistance. If it is determined that refrigerant migration may be reduced or avoided at that determined temperature range, then it may be desirable to increase the determined resistance of the stator 206, to a desired resistance limit or range.

In one non-limiting embodiment, desired resistance may be a single resistance value, or alternatively may be a range of resistance values having an upper limit and a lower limit. If the determined resistance from step 304 is less than or equal to a desired resistance limit or range, the method proceeds to the next step.

In step 308, the control assembly 104 is configured to apply a secondary current to the compressor 102 component based in part, on comparing the determined resistance in step 304 and the desired resistance in step 306.

In one non-limiting embodiment, the secondary current is applied if the determined resistance of the compressor component is less than or equal to the desired resistance of the compressor 102 component. For example, if the determined resistance of the stator 206 is less than or equal to the desired resistance, the control assembly 104 applies a secondary current to the stator 206. If the determined resistance is greater than the desired resistance, the method returns to step 302 to continue applying the initial current.

In another non-limiting embodiment, the desired resistance is a range. In this embodiment, if a determined resistance of a compressor component is below an upper limit or below a lower limit of the desired resistance, then the control assembly 104 is configured to apply the secondary current to the compressor component until the determined resistance of the compressor component is within the desired resistance limit. For example, if the determine resistance of the stator 206 is below the upper limit of the desired resistance, a secondary current is applied to the stator 206 until the determined resistance of the stator 206, exceeds or is equal to the upper limit of the desired resistance range. It will be appreciated that the upper limit may be adjustable. Conversely, if the determine resistance of the stator 206 is below the lower limit of the desired resistance, a secondary current is applied to the stator 206 until the determined resistance of the stator 206, exceeds or is equal to the lower limit of the desired resistance range. It will be appreciated that the lower limit may be adjustable. In an embodiment, if the desired resistance is below the lower limit, the secondary current is applied until the desired resistance is greater than or equal to the upper limit.

The control assembly 104 may be configured to apply a fixed or variable initial current or secondary current, for a period of time. In an embodiment, the initial current or secondary current may be applied continuously or intermittently. For example, a steady initial current may be periodically applied, until there is a need to apply a secondary current. Continuing the example, the initial current may then be increased when the control assembly 104 determines that a secondary current should be applied to maintain the compressor 102 component within a desired resistance range. Once the desired resistance range is achieved, the secondary current may be reduced to the initial current value and the method returns to step 304.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

I claim:

1. A method for heating a compressor when the compressor is off, the compressor having a motor including a rotor and a stator, and a control assembly operably coupled to the compressor, the method comprising the steps of:
   applying an initial current to the compressor motor when the compressor is off;
   measuring a voltage across the compressor motor and determining a resistance of the compressor motor based on the initial current and a measured voltage, the determined resistance corresponding to a temperature of the compressor;
   determining whether the determined resistance is less than or equal to a desired resistance, the desired resistance corresponding to a desired temperature; and
   applying a secondary current to the compressor motor if the temperature is less than or equal to the desired temperature.

2. The method of claim 1, wherein the initial current and the secondary current are applied to at least one of the rotor and the stator.

3. The method of claim 2, wherein the at least one of the initial current and the secondary current is applied in at least one of a fixed and variable quantity.

4. The method of claim 3 wherein the at least one of the initial current and the secondary current is applied for a period of time.

5. The method of claim 1, wherein the desired resistance comprises at least one of an upper resistance limit and lower resistance limit.

6. The method of claim 5, wherein when the determined resistance is less than the lower resistance limit, the secondary current is applied until the determined resistance is greater than or equal to the upper resistance limit.

7. A vapor compression system comprising:
   a compressor, having a motor including a rotor and a stator;
   a control assembly operably coupled to the compressor motor, the control assembly configured to:
      apply an initial current to the compressor motor when the compressor is off;
      measure a voltage across the compressor motor and determine a resistance of the compressor motor based on the initial current and the measured voltage the determined resistance corresponding to a temperature of the compressor;
      determine whether the determined resistance is less than or equal to a desired resistance the desired resistance corresponding to a desired temperature; and
      apply a secondary current to the compressor motor if the temperature is less than or equal to the desired temperature.

8. The vapor compression system of claim 7, wherein the control assembly is configured to apply at least one of the initial current and the secondary current to at least one of the rotor and the stator.

9. The vapor compression system of claim 7, wherein the at least one initial current and secondary current is applied in at least one of a fixed or variable quantity.

10. The vapor compression system of claim 9, wherein the at least one initial current and secondary current is applied for a period of time.

11. The vapor compression system of claim 7, wherein the desired resistance comprises at least one of an upper resistance limit and lower resistance limit.

12. The vapor compression system of claim 11, wherein when the determined resistance is less than the lower resistance limit, the control assembly is configured to apply the secondary current until the determined resistance is greater than or equal to the upper resistance limit.

13. A control assembly comprising:
   at least one connection configured to attach to a component;
   a control device operably coupled to the at least one connection, the control device configured to:

apply an initial current to the component when the compressor is off;

measure a voltage across the component and determine a resistance of the component based on the initial current and the measured voltage the determined resistance corresponding to a temperature of the compressor;

determine whether the determined resistance is less than or equal to a desired resistance, the desired resistance corresponding to a desired temperature; and apply a secondary current if the temperature less than or equal to the desired compressor.

14. The control assembly of claim 13, wherein the component comprises a motor comprising a rotor and stator.

15. The control assembly of claim 14, wherein the control device is configured to apply at least one of the initial current and the secondary current to at least one of the rotor and the stator.

16. The control assembly of claim 15, wherein the at least one initial current and secondary current is applied in at least one of a fixed or variable quantity.

17. The control assembly of claim 16, wherein the at least one initial current and secondary current is applied for period of time.

18. The control assembly of claim 14, wherein the desired resistance comprises at least one of an upper resistance limit and lower resistance limit.

19. The control assembly of claim 18, wherein when the determined resistance is less than the lower resistance limit, the control device is configured to apply the secondary current until the determined resistance is greater than or equal to the upper resistance limit.

* * * * *